(12) United States Patent
Wu

(10) Patent No.: US 6,373,381 B2
(45) Date of Patent: Apr. 16, 2002

(54) VEHICLE SECURITY SYSTEM AND CONTROL METHOD THEREFOR

(75) Inventor: Winson Wu, Kaohsiung (TW)

(73) Assignee: Lite-On Automotive Corporation, Kaohsiung (TW)

( * ) Notice: Subject to any disclaimer, the term of this patent is extended or adjusted under 35 U.S.C. 154(b) by 0 days.

(21) Appl. No.: 09/765,299

(22) Filed: Jan. 22, 2001

(30) Foreign Application Priority Data

Jan. 20, 2000 (TW) ......................................... 089101120

(51) Int. Cl.⁷ .............................................. B60R 25/10
(52) U.S. Cl. ...................... 340/426; 340/428; 340/430; 307/10.5
(58) Field of Search ................................ 340/426, 428, 340/430; 307/10.2, 10.5

(56) References Cited

U.S. PATENT DOCUMENTS

| | | | |
|---|---|---|---|
| 3,858,175 A | * 12/1974 | Kopera, Jr. .................. | 340/63 |
| 4,151,507 A | * 4/1979 | Willis .......................... | 340/64 |
| 4,383,242 A | 5/1983 | Sassover et al. ........... | 307/10.5 |
| 4,754,255 A | * 6/1988 | Sanders et al. ............. | 340/64 |
| 5,307,048 A | * 4/1994 | Sonders ...................... | 340/426 |
| 5,673,017 A | * 9/1997 | Dery et al. .................. | 340/426 |

* cited by examiner

Primary Examiner—Daniel J. Wu
Assistant Examiner—Phung T Nguyen
(74) Attorney, Agent, or Firm—Stevens, Davis, Miller & Mosher, LLP

(57) ABSTRACT

Disclosed is a vehicle security system, in which the vehicle security system comprises a control unit having a central processor or microprocessor, a receiver connected to the microprocessor for receiving signals from a remote transmitter. The control unit has an input interface and an output interface. The input interface is connected to various sensors, and the output interface is connected to the vehicle security devices. A PWM interior light delay is disposed between the door sensors and the input interface to provide a voltage pulse signal with width modulation for a vehicle interior lights such that the interior lights are extinguished gradually for a predetermined time. The user can selectively set the vehicle security system whether the vehicle is provided with the PWM interior light delay. When the vehicle security system enters the security armed state, and the vehicle security system is triggered, the vehicle security system will check whether the last closed time of the door trigger switches exceeds a predetermined time (such as 3 second). If the last closed time exceeds the predetermined time, the alarm would be triggered; if the last closed time dose not exceed the predetermined time, the alarm would not be triggered such that the vehicle security system will not be mistriggered.

9 Claims, 4 Drawing Sheets

VEHICLE SECURITY SYSTEM AND CONTROL METHOD THEREFOR

FIELD OF INVENTION

This invention is related to a vehicle security device, and more particularly to a vehicle security system for a vehicle provided with a PWM interior light delay without being mistriggered.

BACKGROUND OF INVENTION

Vehicle security systems are widely used to deter vehicle theft, prevent theft of valuables from a vehicle, deter vandalism, and to protect vehicle owners and occupants. A typical automobile security system, for example, includes a central processor or controller connected to a plurality of vehicle sensors. The sensors, for example, may detect opening of the trunk, hood, doors, windows, and also movement of the vehicle or in the vehicle. Ultrasonic and microwave motion detectors, vibration sensors, sound discriminators, differential pressure sensors, and switches may also used as sensors. In addition, radar sensors may be used to monitor the area proximate the vehicle. The controller also typically operates to give an alarm indication in the event of triggering of a vehicle sensor. The alarm indication may typically be a flashing of the lights and/or the sounding of the vehicle horn or a siren. In addition, the vehicle fuel supply and/or ignition power may be selectively disabled based upon an alarm condition.

A typical security system also includes a receiver associated with the central processor or the controller that cooperates with one or more remote transmitters typically carried by the user as disclosed, for example, in U.S. Pat. No. 4,383,242. The remote transmitter may be used to arm and disarm the controller in the vehicle or provide other remote control features from a predetermined range outside the vehicle.

As mentioned above, the vehicle security system must be connected to the signal lines of door switches to detect whether the doors are opened illegally so as to trigger the vehicle security system for achieving the purpose of protecting the vehicle. Now, most of the vehicles are provided with the interior light delay, which is convenient for the drivers and passengers. The delay of the interior light is connected to the signal lines of door switches, and thus the interior light will not be extinguished immediately when all doors are closed. Controlled by the interior light delay, the interior light will be delayed to extinguish for a predetermined time such as 10 or 15 seconds. Normally, the interior light delay is a pulse width modulation (PWM), which outputs a voltage pulse signal with width modulation to the interior light of the vehicle such that the interior light is extinguished gradually. FIG. 2a discloses a typical circuit of a PWM interior light delay connecting to a vehicle security system controller, wherein the PWM interior light delay can be positively or negatively triggered. FIG. 2b discloses a voltage pulse signal with width modulation outputted by the PWM interior light delay of negatively triggered type, wherein the interior light will be a open circuit if the output voltage pulse signal is high, and the interior light will be a short circuit if the output voltage pulse signal is low. The modulation width of the voltage pulse signal of the PWM interior light delay increases gradually, and eventually the voltage pulse signal maintains a stable state of high potential such that the interior light is delayed to extinguish gradually for a predetermined time. For the PWM interior light delay of the positively triggered type, the interior light will be a short circuit if the output voltage pulse signal is high, and the interior light will be a open circuit if the output voltage pulse signal is low. The modulation width of the voltage pulse signal of the PWM interior light delay increases gradually, and eventually the voltage pulse signal maintains a stable state of low potential such that the interior light is delayed to extinguish gradually for a predetermined time.

For the installation of the vehicle security system, the door detective signal lines of the security system are normally connected to the output end of the PWM interior light delay. When all of the doors are closed, the PWM interior light delay outputs a voltage pulse signal with width modulation so as to extinguish the interior light gradually. However, as the security system are connected to the output end of the PWM interior light delay, when all of the doors are closed and the door detective signal line receives the voltage pulse signal of the PWM interior light delay, the vehicle security system will misjudge that at least one of the doors is illegally opened and thus be mistriggered to actuate alarm indication, such as a flashing of the lights and/or the sounding of the vehicle horn or a siren. Therefore, this mistrigger of the vehicle security system causes a inconvenient problem to the users. For avoiding the mistrigger of the vehicle security system, the door detective signal lines of the vehicle security system are connected directly to the door switches respectively. However, for such installing method, it is very difficult to find out the position of the door switches and the installation may take much time. Alternatively, a predetermined bypass period, such as twenty (20) seconds, is set for the vehicle security system not to detect the PWM signal of the doors when the vehicle security system is initially armed so as to avoid the undesirable mistrigger. However, various vehicles have various interior light delay time. When the predetermined bypass period is shorter than the interior light delay time, the vehicle security system still might be mistriggered.

For the above-mentioned disadvantages of the prior vehicle security system, there has been a need existing for a vehicle security system for the vehicle provided with a PWM interior light delay in which the vehicle security system would not be mistriggered due to the PWM interior light delay so as to overcome the disadvantages of the prior art.

SUMMARY OF THE INVENTION

It is a primary object of the present invention to provide a vehicle security system for a vehicle with a PWM interior light delay, wherein the vehicle security system would not be mistriggered.

It is another object of the present invention to provide a vehicle security system for a vehicle with a PWM interior light delay, wherein the installation of the vehicle security system is easy and timesaving.

In order to achieve these objects, the vehicle security system according to the present invention mainly includes a control unit having a central processor unit or microprocessor, a receiver which is connected to the microprocessor for receiving a signal from a remote transmitter. The control unit also comprises an input interface and an output interface, wherein the input interface is connected to various vehicle sensors and the output interface is connected to various vehicle security devices. A PWM interior light delay is disposed between the door sensors and the input interface to provide a voltage pulse signal with width modulation for a vehicle interior light such that the interior light is extinguished gradually for a predetermined time.

According to this vehicle security system of the present invention, the user can selectively set the vehicle security system whether the vehicle is provided with the PWM interior light delay. When the vehicle security system enters the security armed state, the vehicle security system will check whether the last closed time of the door switches exceeds a predetermined time (such as 3 seconds). If the last closed time exceeds the predetermined time, the alarm would be triggered; if the last closed time dose not exceed the predetermined time, the alarm would not be triggered such that the vehicle security system will not be mistriggered. Therefore, when all of the door are closed and the PWM interior light delay outputs a voltage pulse signal with width modulation to extinguish the interior light gradually, the vehicle security system according to the present invention will not be mistriggered and the user will not be annoyed. Moreover, since the vehicle security system of the present invention for a vehicle with a PWM interior light delay is directly connected to the output end of the PWM interior light delay, the installation of the vehicle security system is easy and timesaving.

Other objects, advantages, and novel features of the invention will become more apparent from the following detailed description when taken in conjunction with the accompanying drawings.

BRIEF DESCRIPTION OF THE DRAWINGS

FIG. 2b shows the width modulation voltage pulse signal outputted by the PWM interior light delay of FIG. 2a.

DETAILED DESCRIPTION OF THE PREFERRED EMBODIMENT

Figure 1:
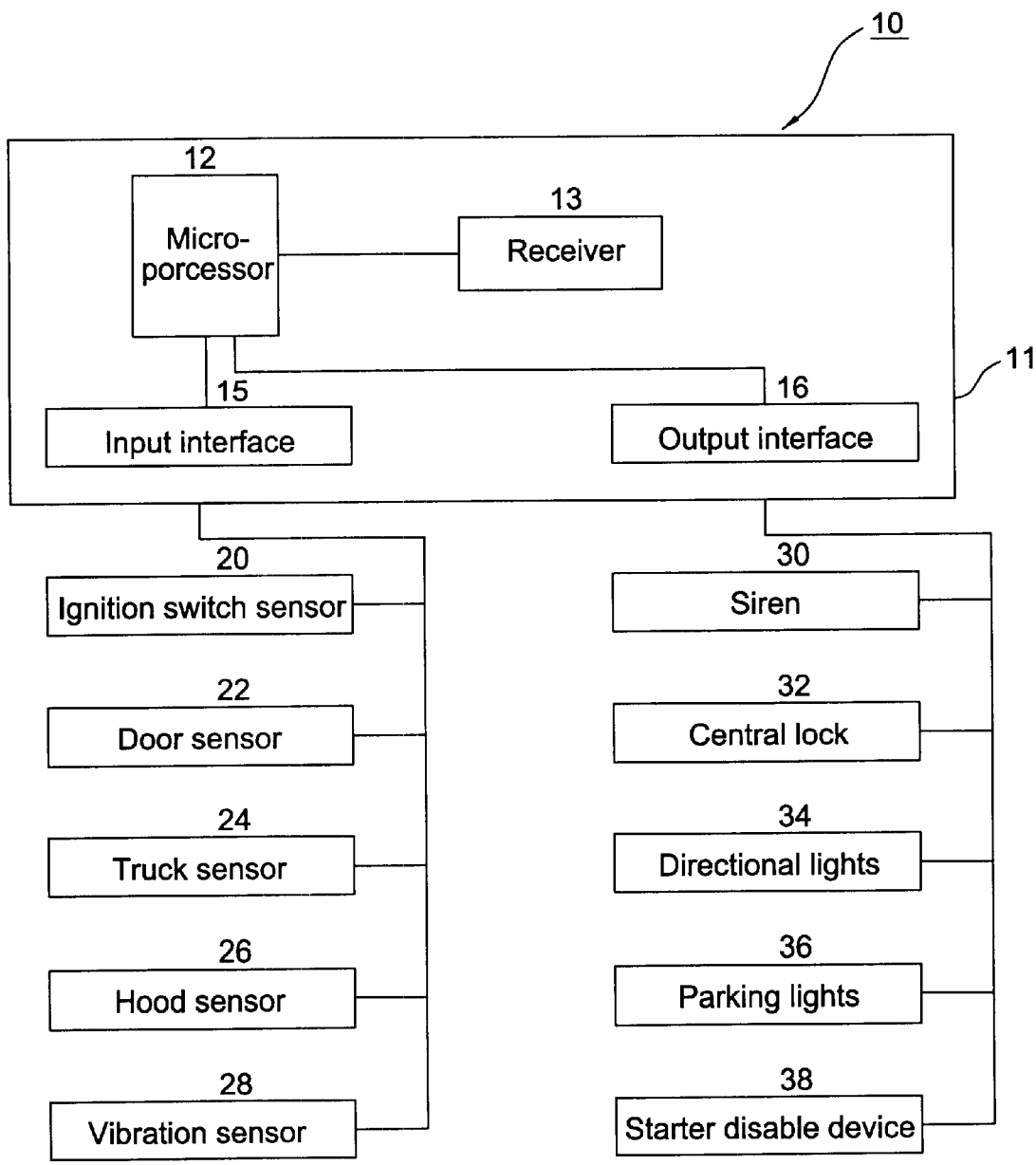
FIG. 1 is a schematic block diagram of the vehicle security system in accordance with this invention.

Now referring to the schematic block diagram of FIG. 1, the vehicle security system 10 according to the present invention includes mainly a control unit 11 having a central processor or microprocessor 12 operating under stored program control. A receiver 13 is connected to the microprocessor 12 for receiving the signals from a remote transmitter. The control unit 11 also provides an input interface 15 and an output interface 16. The input interface 15 is connected to various vehicle sensors including: ignition switch sensor 20, door sensors 22, a trunk sensor 24, a hood sensor 26 and vibration sensors 28. As would be readily understood by those skilled in the art, the sensors would not be limited to the above-mentioned sensors, and other sensors of the vehicle security can also be connected to the input interface 15 to achieve the function of the present invention. The output interface 16 is connected to the vehicle security devices, such as a siren 30, a central lock 32, directional lights 34, parking lights 36 and a starter disable device 38. It should be understood by those skilled in the art that the vehicle security devices would not be limited to the above-mentioned devices, other vehicle security devices also can be connected to the output interface 16 to achieve the function of the present invention.

Figure 2A:
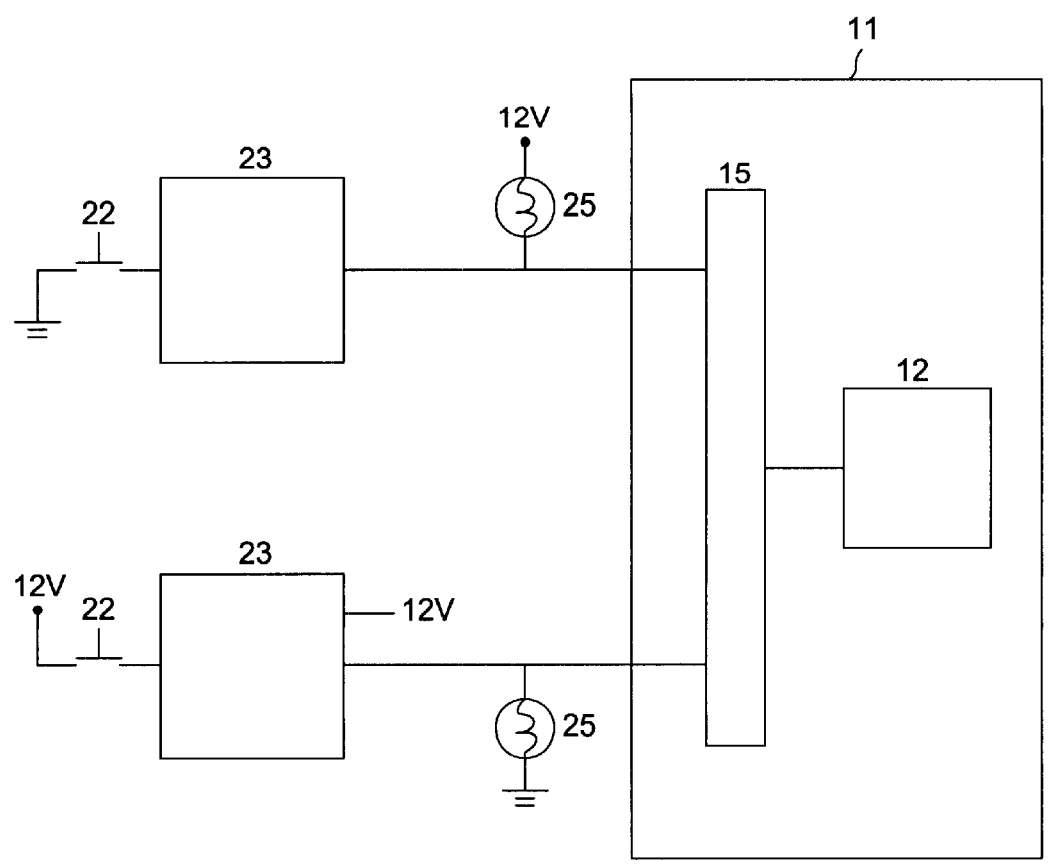
FIG. 2a is a schematic block diagram showing that a typical PWM interior light delay is connected to a controller of vehicle security system.
Figure 2B:
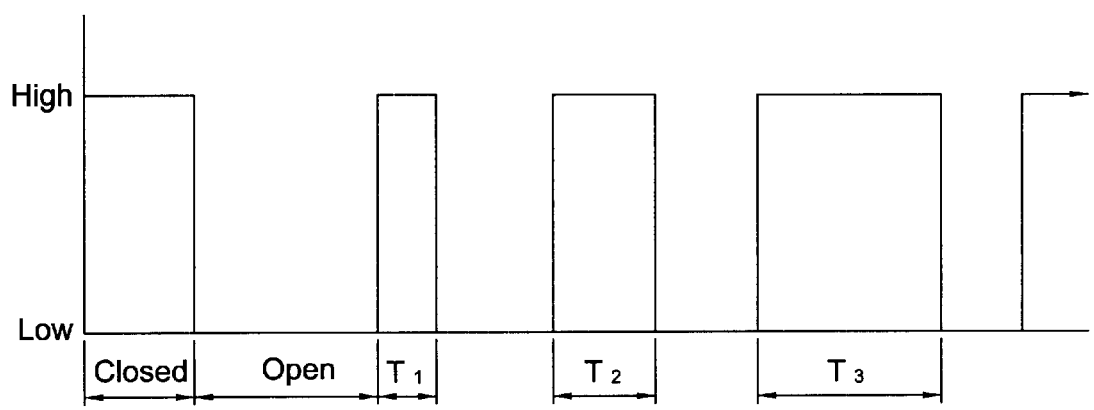

As shown in the FIG. 2a, as a interior light delay is employed by the vehicle interior light 25, a PWM interior light delay 23 is disposed between the door sensors 22 and the input interface 15 to provide a voltage pulse signal with width modulation to the vehicle interior light 25 such that the interior light are extinguished gradually. The PWM interior light delay 23 may be a positive trigger (Door+) or a negative trigger (Door−) PWM interior light delay 23. As shown in the FIG. 2b, when the each door sensors 22 detect that all doors are closed, the PWM interior light delay 23 outputs a voltage pulse signal with width modulation to the vehicle interior light 25. The vehicle interior light 25 will form an open circuit if the output voltage pulse signal is at high potential, and the vehicle interior light 25 will form a short circuit if the output voltage pulse signal is at low potential. The modulation width of the voltage pulse signal of the PWM interior light delay increases gradually, and then the voltage pulse signal forms a stable state of high potential such that the interior light is extinguished gradually after a predetermined time. As shown in the FIG. 2b, the modulation width T1, T2, T3 of the high potential of the voltage pulse signal of the PWM interior light delay increases gradually, the last modulation width of the high potential is T3 before the voltage pulse signal forms a stable state of high potential and the interior light 25 forms a completely open circuit. Therefore, after all of the vehicle doors are closed, if the vehicle security system 10 has been set as armed state before the interior light 25 forms a completely open circuit, that is, before the modulation width of the high potential of the voltage pulse signal of the PWM interior light delay 23 is T3 (typical 3 second), and the input interface 15 receives the voltage signal of the PWM interior light delay 23, the vehicle security system 10 will misjudge that at least one of the doors is illegally opened and thus be mistriggered to actuate the alarm indication, such as a flashing of the lights, a sounding of the vehicle horn or a siren. Therefore, this mistrigger of the vehicle security system causes an inconvenient problem to the users. For overcoming the above-mentioned problems of the prior art, the vehicle security system 10 according to the present invention provides a software switch in which the vehicle security system 10 can be set into the armed state after the interior light 25 forms a completely open circuit, that is, after the high potential of the voltage pulse signal of the PWM interior light delayer 23 forms the stable state (the last modulation width is T3), thus the mistrigger of the vehicle security system 10 can be avoided.

Figure 3:
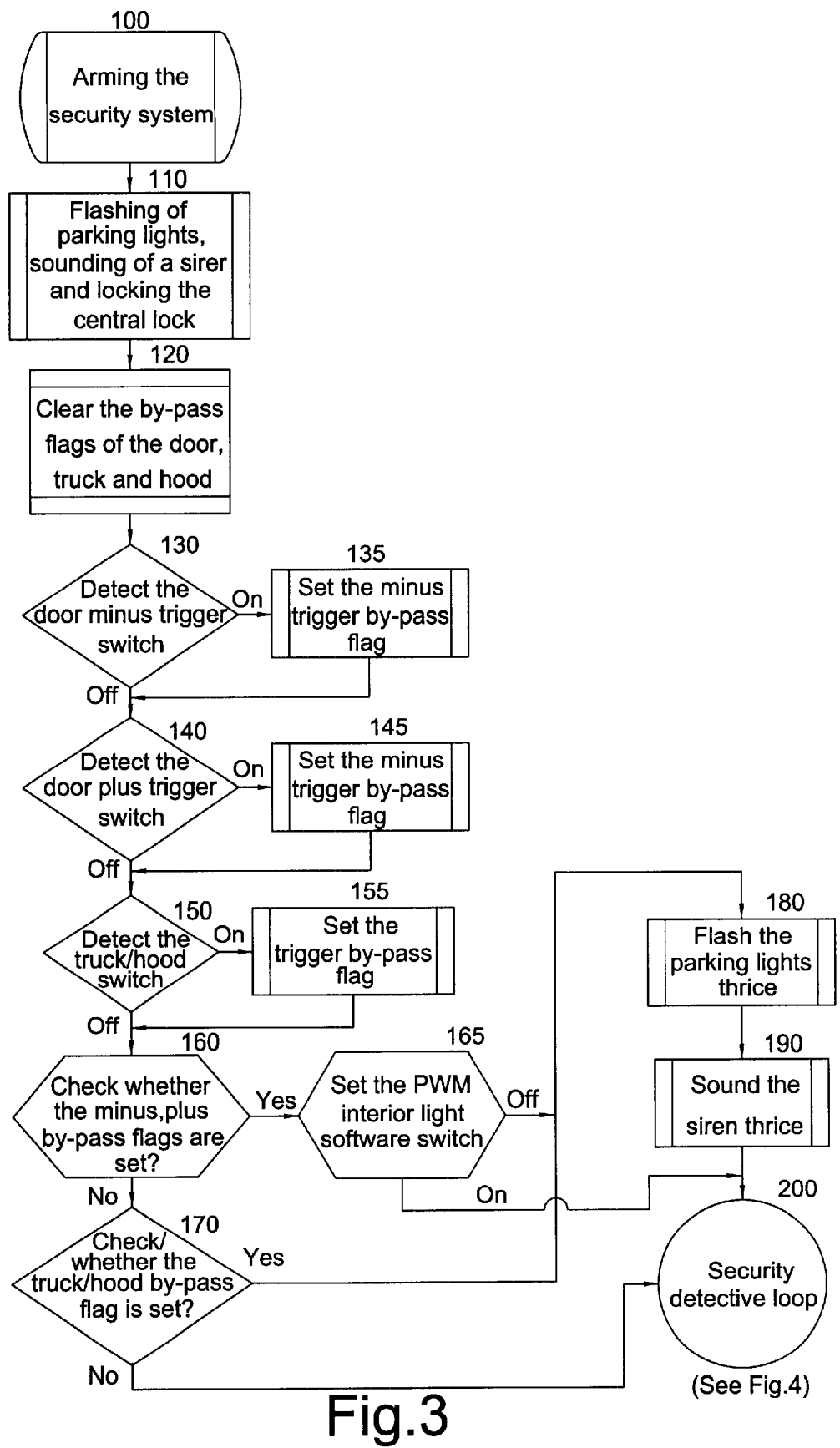
FIG. 3 is a security arming flowchart of the vehicle security system according to the present invention.

Now referring to FIG. 3, it illustrates a security arming flowchart of the vehicle security system according to the present invention. First, in step 100, the user presses the security arming bottom of the remote transmitter and the receiver 13 receives the actuating signals to arm the security procedure through the micro-processor 12. The microprocessor 12 controls the flash of the parking lights once, the sounding of the siren once and locks the center control lock (as in step 110), and then clears the by-pass flags of the doors, the trunk and the hood (as in step 120).

Then in step 130, the micro-processor 12 detects the door negative trigger switch of the door sensors 22 to check whether the door is open. If the door is closed, the micro-processor 12 will detect the door positive trigger switch of the door sensors 22 to check whether the door is open (as in step 140). If the door is open, the by-pass flag of the negative trigger is set (as in step 135), then goes to step 140.

In step 140, the micro-processor 12 detects the door positive trigger switch of the door sensors 22 to check whether the door is open. If the door is closed, then detects the trunk sensor 24 and the hood sensor 26 to check whether they are open (as in step 150), If the door is open, the by-pass flag of the positive trigger is set (as in step 135), then goes to step 150.

In step 150, the micro-processor 12 detects the trunk sensor 24 and the hood sensor 26 to check whether they are open. If the trunk/hood is closed, then goes to step 160. If the trunk/hood is open, the trunk/hood by-pass flag is set (as in step 155), then goes to step 160.

In step 160, the micro-processor 12 detects whether the positive and negative trigger by-pass flags are set. If the positive and negative trigger by-pass flags have been set, then goes to step 165. If the positive and negative trigger by-pass flags are not set yet, then goes to step 170. In step 165, the user selects whether the vehicle is provided with the PWM interior light delay 23. If the vehicle is provided with the PWM interior light delay 23, then the software switch is set as on and goes to step 200 in which the security detective loop will be proceeded. If the vehicle does not have the PWM interior light delay 23, the software switch is set as off, then the microprocessor will flash the parking lights 36 thrice (as in step 180) and sound the siren 30 thrice (as in step 190) and goes to step 200 in which the security detective loop will be proceeded.

In step 170, the micro-processor 12 detects whether the trunk/hood by-pass flags are set. If the trunk/hood by-pass flags have been set, then goes to step 180; if the trunk/hood by-pass flags have not been set, then goes to step 200 in which the security detective loop will be proceeded.

Figure 4:
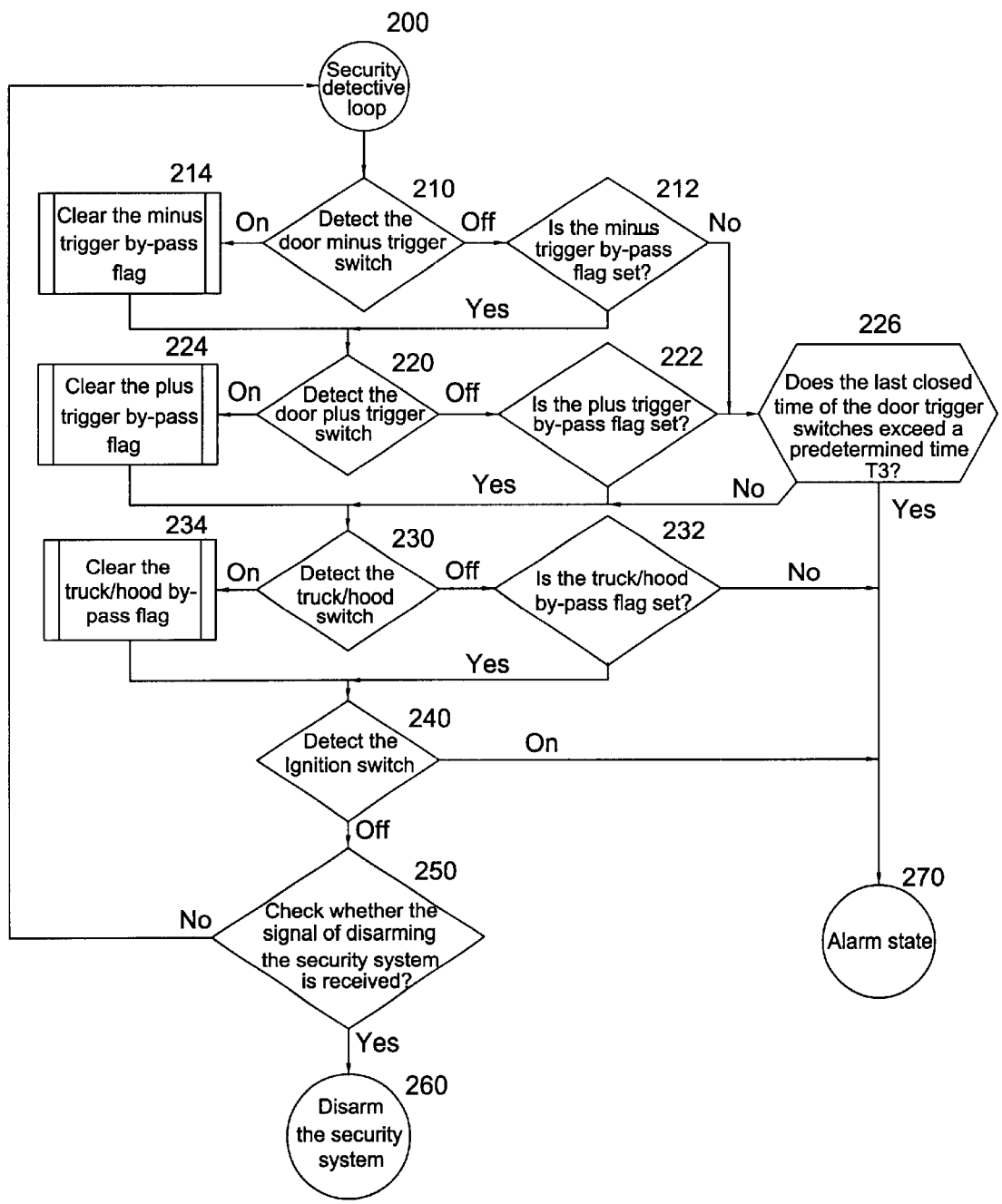
FIG. 4 is a security detective flowchart of the vehicle security system according to the present invention.

Now referring to FIG. 4, it illustrates a security flow chart of the vehicle security system according to the present invention. The step 200 is a security detective loop, wherein a control unit 11 is set up into the security detective state via the program, and each sensor is controlled to detect respectively. In step 210, the door negative trigger switches of the door sensor 22 are detected to check whether the door is open. If the door is closed, the negative trigger by-pass flag is cleared (step 214), then goes to step 220. If the door is open, it is checked whether the negative trigger by-pass flag is set (step 212). The step 220 will be proceeded if the negative trigger by-pass flag is set, and the step 226 will be proceeded if the negative trigger by-pass flag is not set.

In step 220, the door plus trigger switches of the door sensor 22 are detected to check whether the door is open state. If the door is in closed, the positive trigger by-pass flag is cleared (step 224), and then the step 230 will be proceeded. If the door is open, it is checked whether the positive trigger by-pass flag is set (step 222). The step 230 will be proceeded if the positive trigger by-pass flag is set, and the step 226 will proceeded if the positive trigger by-pass flag is not set. In step 226, it is checked whether the last closed time of the door sensor 22 exceeds T3 (such as 3 seconds). If the last closed time exceeds T3, then the alarm state of the step 270 will be proceeded; if the last closed time dose not exceed T3, the step 230 will be proceeded. The vehicle security system 10 according to the present invention will be set entered into the alarm state only after the interior light 25 is a completely open circuit, that is, the voltage pulse signal of the PWM interior light delay 23 forms a stable state of high potential (after the last modulation width is T3). Accordingly, the mistrigger of the vehicle security system 10 can be avoided.

In step 230, the trunk sensor 24 and hood sensor 26 are detected to check whether the trunk and hood are in the open state. If the trunk/hood is in the closed state, the trunk/hood by-pass flag would be cleared (the step 234), and then goes to step 240. If the trunk/hood is in the open state, it is checked whether or not the trunk/hood by-pass flag is set (the step 232). The step 240 will be proceeded if the trunk/hood by-pass flag is set, and the alarm state of the step 270 will be proceeded if the trunk/hood by-pass flag is not set.

In step 240, the ignition switch sensor 20 is detected to check whether or not the ignition switch is in the turn-on state. If the ignition switch is in the turn-on state, the alarm state of the step 270 will be proceeded; if the ignition switch is not in the turn-on state, then step 250 will be proceeded.

In step 250, the microprocessor 12 checks whether or not the receiver 13 has received the signal for disarming the security system. If the signal for disarming the security system has been received, the step 260 for disarming the security system will be proceeded; if the signal for disarming the security system is not received, the step 200 will be proceeded to restart the security detective loop. In the alarm state of step 270, the microprocessor 12 can trigger the siren 30, the directional lights 34, the parking lights 36 to give an alarm indication, such as a flashing of the lights, a sounding of the vehicle horn and the starter disable device 38 to disable the vehicle fuel supply or ignition power for prevent the vehicle from being illegally started.

As set forth in the foregoing description, according to the vehicle security system of the present invention, the user can selectively set up the vehicle security system whether the vehicle is provided with the PWM interior light delay 23. If the vehicle is provided with the PWM interior light delay 23, the software switch will be set as on, and if the vehicle is not provided with the PWM interior light delay 23, the software switch will be set as off, as in step 165. When the vehicle security system 10 enters the security detective state, as in step 226, the vehicle security system will check whether or not the last closed time of the doors exceeds a predetermined time T3 (such as 3 second). If the last closed time exceeds the predetermined time T3, the step 270 of the alarm state will be proceeded; if the last closed time dose not exceed the predetermined time T3, the alarm state of the vehicle security system 10 will not be triggered such that the vehicle security system will not be mistriggered. Therefore, when all of the door are closed and the PWM interior light delay 23 outputs a voltage pulse signals with width modulation to extinguish the interior lights gradually, the vehicle security system according to the present invention will not be mistriggered and the user will not be annoyed. Moreover, the vehicle security system of the present invention for a vehicle with a PWM interior light delay is directly connected to the output end of the PWM interior light delay so the installation of the vehicle security system is easy and timesaving.

It will be understood that the embodiments described herein are exemplary, and that a person skilled in the art may make many variations and modifications without departing form the spirit and scope of the invention. All such modifications are intended to be included within the scope of the invention as defined in the appended claims.

What is claimed is:

1. A vehicle security control method for a vehicle security system to prevent the vehicle security system from being mistriggered, the vehicle security system having at least one door trigger switch to detect the door is open or not; and a pulse width modulation (PWM) interior light delay connected to the door trigger switch, the pulse width modulation (PWM) interior light delay having a last modulation width time T before the pulse width modulation interior light delay forms the stable state, the control method of the vehicle security system including the following steps of:

starting to arm the security system;

detecting the door trigger switch to check whether the door is in open state, if the door trigger switch is in open state, a door trigger switch by-pass flag is set;

actuating a security detective loop;

if detecting of the door trigger switch is the open state, and the door trigger by-pass flag is set, then go to the step of actuating the security detective loop;

if detecting of the door trigger switch is the open state, the door trigger by-pass flag is not set, and the last close time dose not exceed the predetermined time T, then go to the step of actuating the security detective loop; and if detecting of the door trigger switch is the open state, the door trigger by-pass flag is not set, and the last close time exceeds the predetermined time T, then trigger the vehicle security system.

2. The control method for a vehicle security system according to claim 1, further comprising the step of disarming the security system.

3. The control method for a vehicle security system according to claim 1, further comprising the step of detecting the ignition switch.

4. The control method for a vehicle security system according to claim 3, wherein if detecting of the door trigger switch is a close state, and the door trigger by-pass flag is not set, then clear the door trigger by-pass flag which has been set.

5. The control method for a vehicle security system according to claim 1, wherein the door trigger switch is a plus trigger switch.

6. The control method for a vehicle security system according to claim 1, wherein the door trigger switch is a minus trigger switch.

7. A vehicle security system including:

a least one door trigger switch to detect whether the door is open or not;

a pulse width modulation (PWM) interior light delay being connected to the at least one door trigger switch, the pulse width modulation (PWM) interior light delay having a last modulation width time T before the pulse width modulation interior light delay forms the stable state;

a device for starting to arm the security system;

a device for detecting the door trigger switch whether be open state or not, if the door trigger switch is open state, a door trigger switch by-pass flag is set;

a device for actuating a security detective loop;

wherein if detecting of the door trigger switch is the open state, and the door trigger by-pass flag is set, then actuating the security detective loop;

if detecting of the door trigger switch is the open state, the door trigger by-pass flag is not set, and the last close time dose not exceed the predetermined time T, then actuating the security detective loop; and if detecting of the door trigger switch is the open state, the door trigger by-pass flag is not set, and the last close time exceeds the predetermined time T, then triggering the vehicle security system.

8. The vehicle security system according to claim 7, wherein the door trigger switch is a plus trigger switch.

9. The vehicle security system according to claim 7, wherein the door trigger switch is a minus trigger switch.

* * * * *